H. WORKMAN.
MOTION PICTURE APPARATUS AND MOTION PICTURE FILM THEREFOR.
APPLICATION FILED MAY 8, 1916.

1,328,352. Patented Jan. 20, 1920.

Witnesses:
Albert G. Barnes.
Henry Richard S. Brunsdon

Inventor:
Harold Workman
by
H. C. Heide, Attorney.

H. WORKMAN.
MOTION PICTURE APPARATUS AND MOTION PICTURE FILM THEREFOR.
APPLICATION FILED MAY 8, 1916.
1,328,352.
Patented Jan. 20, 1920.
2 SHEETS—SHEET 2.
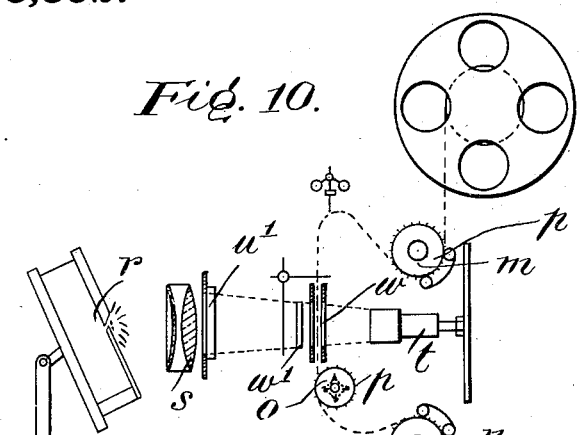
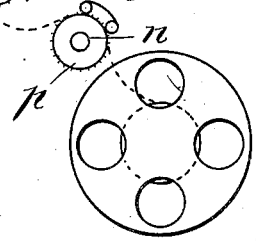
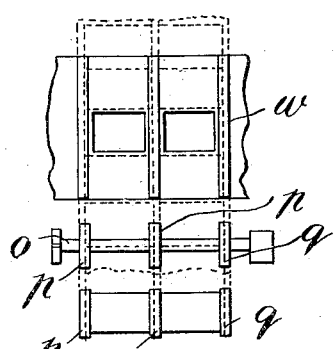
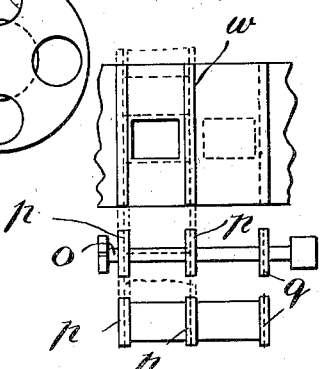
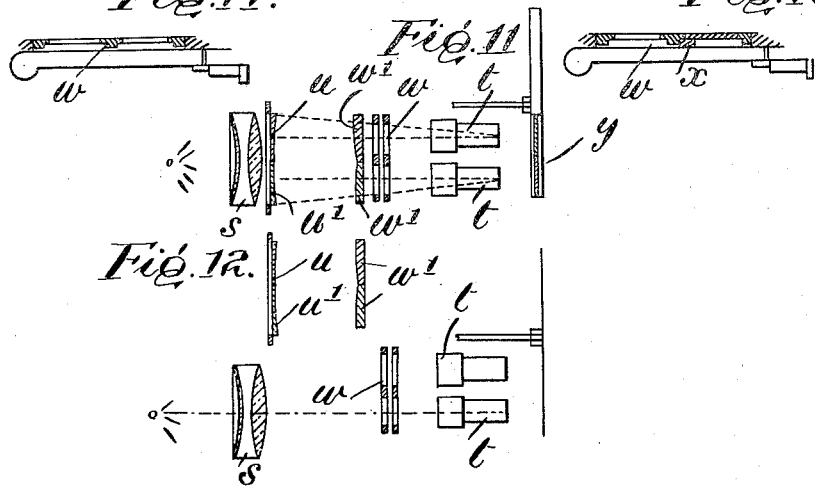
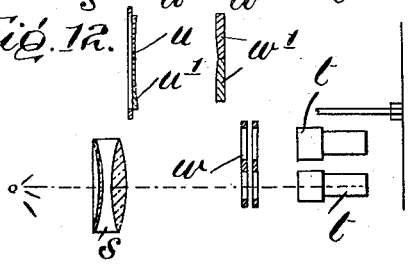
Witnesses:
Albert Barnes
Henry Richard S. Brunsdon.
Inventor
Harold Workman
by
H C Heide Attorney.

UNITED STATES PATENT OFFICE.

HAROLD WORKMAN, OF GLASGOW, SCOTLAND.

MOTION-PICTURE APPARATUS AND MOTION-PICTURE FILM THEREFOR.

1,328,352.      Specification of Letters Patent.      Patented Jan. 20, 1920.

Application filed May 8, 1916. Serial No. 96,191.

*To all whom it may concern:*

Be it known that I, HAROLD WORKMAN, a subject of His Majesty King George V of the United Kingdom of Great Britain and Ireland and of the British Dominions Beyond the Sea and Emperor of India, residing at Glasgow, Scotland, have invented certain new and useful Improvements in or Relating to Motion-Picture Apparatus and Motion-Picture Films Therefor, of which the following is a specification.

This invention relates to color cinematography of the kind in which two or three rows of separate color negative records are produced side by side upon one film in the camera the pictures being preferably taken simultaneously in groups of two or three and printed positives from such negative films having been made, the pictures of each group are projected simultaneously through two or three separate projection lenses and suitable color filters, so that a series of colored pictures is produced upon the screen by the projection of the successive groups.

Projecting apparatus suited for showing ordinary standard or single width film will not serve for showing film of the class hereinabove described and exigencies of space and other conditions appertaining to the operating boxes of living-picture houses preclude generally speaking the instalment in the operating box of another projector for such special duty only. At the same time it will ordinarily not be desirable to sacrifice the means of showing a film of the one character for the means of showing a film of the other character.

An object of the present invention is to provide new or improved apparatus and means whereby color film of the class described can be so taken and projected in such a way that with a few simple adjustments the ordinary standard or single width film can be shown by one and the same projector.

To such end or aim the invention comprises a method of showing either a color cinematograph film of the class described or an ordinary standard film by one and the same projector, characterized by forming the color film so as to run on ordinary standard sprocket rims and so as to have two or more rows of perforations true to gage to drive it, and by providing a projector, having feed and take up sprocket wheels comprising ordinary standard sprocket rims, and an intermittent movement comprising that for standard film, with a wide two or three gate-apertured film track, a corresponding number of lenses, means for distributing and directing the light through such gate apertures and such lenses, means for adjusting the illumination for that one of the gate apertures which corresponds to the standard sprocket rims, and facilities for closing the remaining gate aperture or apertures and for inserting a side guide or guides as may be necessary for the standard film, and removing the color filter if any from the light path corresponding to the standard film.

In this connection the invention comprises a new or improved wide cinematographic film, and a projector adapted to project such a film, and also, with a few simple adjustments, to project ordinary standard or single width film.

As essentially conducing to the realization of the end or aim of this invention, a wide cinematographic film provided thereunder is characterized by having two rows of perforations of standard size, pitch and separation, one rank of images being ranged between the two rows of perforations, and the other rank, or ranks, being ranged outside of such two rows of perforations, either, in the case of the two added ranks, on the same side or on opposite sides of such two rows of perforations, and having a pressure guide margin or margins which may be perforated with holes of standard or other convenient size and pitch running outside the added rank, or ranks.

Of the above defined wide cinematographic film, that portion thereof which, by definition can run on an ordinary standard sprocket may be and is preferably an equivalent of or replica of a standard film, *i. e.*, it has perforated pressure guide margins of the usual standard width on each side of its picture rank, and conveniently and advantageously, the added rank, or ranks, of pictures or picture areas will have one edge of such added rank or every such rank immediately contiguous to the outer edge of that which in the band is the aforesaid replica or equivalent of a standard film, or immediately contiguous to a pressure guide margin similar to that of a standard film running outside such first added rank.

In this way the full ordinary or standard pressure runner area may be retained, projection of adjacent side by side pictures without any marginal loss is made possible, and at the same time the arrangement is favorable to economical employment of material.

The two actual rows of perforations which are true to gage to drive may vary or they may be the only rows. For example, if, in the case of a wide film for two color cinematography the two outer rows of perforations are true to gage to drive, the medial row of perforations may be made with large or clearing holes so as to run upon the corresponding standard sprocket rim without gearing therewith. Or if the film is for use in the camera, where the camera is so constructed, the medial sprocket teeth and row of perforations may be dispensed with. It is therefore to be understood that provided there are sufficient rows of perforations true to gage to drive, such or a similar modification of a wide film for either two or three color cinematography is contemplated by and forms part of the present invention.

As companion with and interlocked with the herein defined cinematograph film for realizing the aim in view, the present invention provides for a cinematograph projector having two or three gate apertures arranged side by side at the same or different levels, according as the separate color record images of the respective heliochromic groups are set in relation to each other and as a group on the wide film, and two or three projection lenses suitably disposed in front of such gate apertures to project and with the aid of color filters to combine the said images into one image in color on the screen, the feed and take up sprocket wheels as adapted to such wide positive films essentially comprising two rims of sprocket teeth of the ordinary standard size, pitch and separation, and the projector being so otherwise constructed and arranged that by a few simple adjustments it may be adapted to show ordinary standard or single width film.

As illustrative of the nature of the adjustments required, an arrangement of projector which will serve is one in which there is provision for (a) closing up the gate aperture or apertures other than that corresponding to the sprocket rim pair for the standard film, (b) altering the lighting arrangement to illuminate that gate aperture only, and, (c) arranging a side guide or guides for the standard width film as may be necessary. Where necessary there must also be provision for admitting of the removal of the color filter from the path of the light beam passing through the aforesaid gate aperture. And if, for the purpose of using a lens of larger aperture for the ordinary standard or single width film, it is desirable to suitably dispose a separate lens in front of the said gate aperture, there must be provision for moving the lenses for the color projection out of position and for moving the separate lens into position.

The lighting system for the color film may conveniently be of the type described in British patent application No. 7659 of 1915 the prisms at the condenser and gate being moved out of the light path and the lantern body being moved sidewise into alinement with the single gate aperture when projecting standard film.

As regards the color filters for use in projecting the wide positive films, these color filters may be provided in any of the well known manners; thus they may be stationary or revolving; or running color filters may be used, or the color may be carried in or upon the films themselves.

In the provision of a wide positive color record cinematographic film of the herein defined character the invention secures conditions more favorable to combining the separate color record images of successive heliochromic groups into one image in color if the separate color record images of the successive groups be taken simultaneously from the same point or aspect of view, and a film so further characterized is to be regarded as part of the present invention.

By ordinary standard or single width film in the present specification is particularly meant what by convention is universally or generally adopted, as film which will run through all ordinary projectors in cinematograph theaters, this film at the present day being approximately 1⅜ inches wide, and the pictures produced upon it being approximately 1 inch wide by ¾th inch high, 3/16th inch or approximately so being allowed on each side for the perforated pressure-guide margins, the perforations (arranged four on each side of each picture) being close up to the picture on both sides of it.

As an example of carrying out the invention on the foregoing present day standard for a two color system the film may be made of such a width as to provide a strip for example 1 3/16th inches wide at one side of the standard or single width film, giving room for the second color record with pictures of the standard size, i. e., 1″ x ¾″, and for 3/16th inch margin for a standard or other row of perforations outside the broad film in addition to the usual row of perforations at the other side. The intermediate row of perforations may be and preferably is standard size and pitch so as to engage the sprocket wheels of the driving mechanism, but they may be made clearing holes to ride over the sprocket teeth without engaging them, provided the other rows of perforations serve to drive.

In the negative film for use in the color taking camera, the film may be provided with an intermediate row of perforations, but not necessarily so, as the film may be operated by the perforations at each side.

The camera is arranged for the standard pull or intermittent movement of ¾ inch per pair of pictures, with two gates alongside each other at the desired level or levels.

The two color printing machine will have the ordinary pull of ¾ inch per picture which may be actuated by any suitable or known manner utilizing either the three rows of perforations if the negative film has been so perforated, or the two side rows of perforations if the negative film has not been so perforated, or the two side rows may only be used in either case.

The printing machine will have two gates suitably spaced to print the pictures taken in pairs, and these gates should be evenly illuminated preferably from one light source.

The projector when used for two color projection will have the ordinary standard pull of ¾ inch per pair or group of pictures, which may be actuated by any suitable or known means such for instance as a Maltese cross or dog movement, the gates being suitably spaced to project the pictures as taken in pairs, and the two gates may be evenly illuminated for this type of projection by any suitable or known means, preferably from one arc or other suitable light source, this being movable laterally to adjust it to the single gate aperture when ordinary standard or single width film is desired to be shown.

The projector is preferably of the fixed gate type having a racking movement for adjusting the position of the pictures on the sheet by moving the intermittent driving mechanism and film relatively to the gate opening, and the racking movement may be provided for in any suitable or known manner.

The sprocket wheels both feed and take up together with the intermittent sprocket wheel also if a Maltese cross movement is employed, have sprocket-rims suitably spaced to engage the perforations of ordinary standard or single width film, and have an additional sprocket rim to engage the extra row of perforations at the side of the wide color film.

In adapting the projector from the two color type to project ordinary standard or single width films, the following changes must be made:—

1. The lighting arrangement must be altered so that the condensed beam of light passes through one gate and the axis of one projection lens, instead of both.

2. The second gate must be closed up and a suitable side guide, as may be necessary, fitted to engage the free side of the standard or single width film.

3. The color filter, when not embodied in the positive film, must be removed from the path of the projection lens used for single width projection.

In applying the invention to a three color system as an example the film may be made 2⅜ inches wider than standard film width thus allowing for two further standard sized pictures, and in addition to the one row of intermediate perforations a second row of intermediate perforations may be provided between the two further rows of pictures if so desired.

As before, only the two outside rows of perforations need be used in the triple exposure camera and triple gate printer, but preferably an intermediate row or rows of perforations are employed.

In the three color projector four rows of intermittent sprocket rims and teeth may be provided and the perforations in the intermediate row or intermediate rows in the film may either engage or clear the teeth in their path.

Alterations similar to those already described will enable the projector to be adapted for showing standard or single width film or two color film as previously described.

There may however be cases where it is only desired to provide a projector for showing standard or single width films and three color films and in such cases the sprocketing and the perforated pressure guide margins may be modified accordingly.

As illustrating the invention I have appended two sheets of drawings in one of which various forms of cinematographic films of multiple width which will serve for the end or aim in view are figured, and in the other of which diagrammatic views of a cinematographic projector arranged in accordance with the invention are depicted.

Fig. 10 and Figs. 11 and 12 are diagrammatic side and plan views respectively of a projection apparatus according to the present invention.

Figs. 13 and 14 are respectively front and plan views of the gates when showing wide color film.

Figs. 15 and 16 are respectively front and plan views of the gates when showing ordinary standard or single width film.

Figure 1:
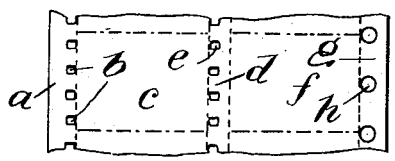
Figures 1 to 9 illustrate various forms of wide cinematographic films as correlated to or as an essential part in the use of the projection apparatus according to the present invention.

By Fig. 1, Sheet 1, is shown a cinematographic film of multiple width containing the following component parts counting from edge to edge of the film; (1), a pressure guide margin $a$ provided with a row of perforations $b$ of standard size and pitch ranged therealong; (2), a standard picture area rank $c$; (3), a pressure guide margin $d$ provided with a row of perforations $e$ of standard size and pitch ranged therealong at a standard distance from the first mentioned row; (4), a standard picture area rank $f$; and (5), a pressure guide margin $g$ provided with a row of perforations $h$ of other than standard size and pitch.

Figure 2:
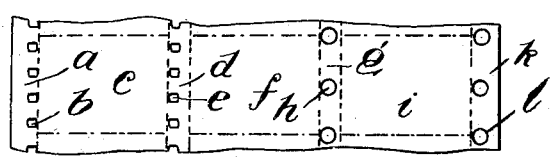

By Fig. 2 is shown a film according to Fig. 1 but extended in the manner of width by the following additional component parts (6), a standard picture area rank $i$; and (7), a pressure guide margin $k$ provided with a row of perforations $l$ of other than standard size and pitch.

Figure 3:
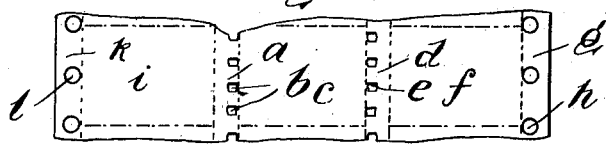

Fig. 3 shows how the additional component parts $i$ and $k$ of Fig. 2 may extend the film Fig. 1 from the margin $a$ in lieu of the margin $g$ thereof.

Figures 4, 5:
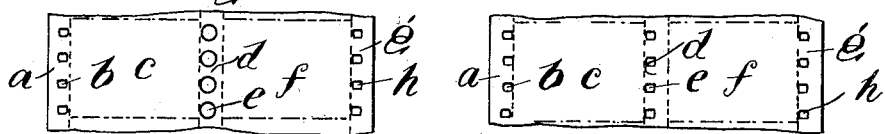

By Fig. 4 is depicted a film like Fig. 1 except that the outer rows of perforations are made to serve to drive while the medial row of perforations $e^1$ are made with large or clearing holes to run upon the corresponding rim of the usual standard pair of sprocket rims.

Figure 6:
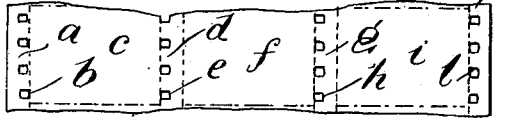
Figure 7:
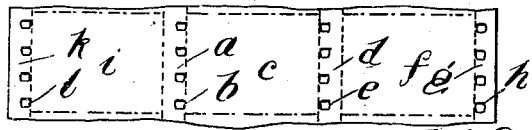

By Figs. 5, 6, and 7, are shown films like Figs. 1, 2, and 3 respectively, except that each and every component part counting from edge to edge of the films conforms exactly to a like part of an ordinary standard or single width film as hereinbefore defined.

Figure 8:
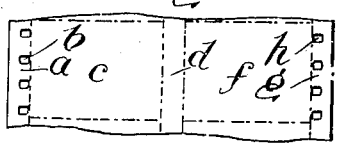

Fig. 8 shows a film like Fig. 5 except that the medial row of perforations $e$ is omitted. Such a film will however serve only for negative image recording purposes inasmuch as it will not run upon the usual standard pair of sprocket rims on the projector.

Figure 9:
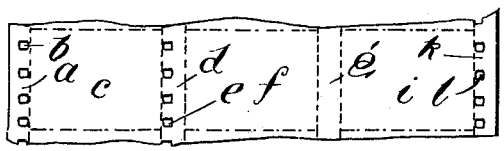

Fig. 9 shows a film like Fig. 6 except that the intermediate row of perforations $h$ is omitted. Such a film will serve both for recording and for projection purposes, but will not admit of one and the same projector showing two color as well as three color films in addition to ordinary standard or single width films.

Provided there are at least two rows of perforations true to gage to drive the remainder may or may not be large or clearing holes. A film may tend to run more smoothly on two sprocket rims than on three, as on two there can be an easier arching or more uniform rub down of any bind or friction or scraping owing to the expansion or contraction or defective gage or other like cause. The holes of the medial series may thus be made so large that the sprocket teeth will not touch the margin of any hole of this medial series.

Where the wide film is one as in Fig. 5, that is characterized by the additions in the manner of width to a standard film of an outriding immediately contiguous standard picture rank and outside that a perforated standard pressure guide margin, an important result is gained that the film can not be threaded up in the machine in reverse aspect because that row of perforations of the standard film which in the wide film is medial is at a greater distance from the perforations in the pressure guide margin which is alongside the outriding picture rank, than the distance between the driving rims of the standard sprocket.

Figs. 10, 11 and 12 show diagrammatically a side view, and plan views respectively of a projector suited to carry the present invention into practice, two gate apertures and two lenses being shown by way of example.

Figs. 13 and 14 are respectively a front view and a plan view of the two gates when showing the wide color film, while—

Figs. 15 and 16 are respectively a front view and a plan view of the two gates when showing ordinary standard or single width film.

Both the feed and take up sprocket wheels $m$ and $n$ together with the intermittent sprocket wheel $o$ when a Maltese cross movement is employed have a standard pair of sprocket rim $q$ to engage the extra row of film, or, alternatively to take the standard pair of rows of perforations as defined of the wide film, and also have an additional sprocket rim $q$ to engage the extra row of perforations of the wide film.

The lantern house when comprising a single source of light $r$ and condenser $s$ is movable laterally to adjust the light source for use through one gate (Fig. 12) or for use through two gates (Fig. 11) means being provided in the former case for closing up the gate not being employed, and a suitable side guide $x$ shown in Fig. 16 being fitted to engage what would otherwise be the free margin of the standard or single width film. If a lens of larger aperture is to be used for projecting the ordinary standard film then the pair of lenses $t$, $t$ shown will be movable as hereinabove described. Also if color filters $y$ (Fig. 11) are separate from the wide films themselves, such color filters will be made readily removable in any approved manner.

In Figs. 10, 11 and 12 is illustrated a form of light distributing and light directing device for a simple light source which will serve well when adapting the projector to show the wide color film, this device being fully described in a patent of the present applicant numbered 7659 of A. D. 1915. (Great Britain).

As shown $u$, $u^1$ are a pair of negative cylindrically curved prisms fitted close to and in front of the condenser $s$ to illuminate the two gates and a reasonable margin around them, $w^1$, $w^1$ are a pair of positive cylindrically curved prisms fitted near the gate apertures and on the lantern side of them, which prisms correct the distortion produced by the prisms at the condenser and direct the beams of light passing through them so that their axes pass normally through the gate apertures and the centers of the corresponding projection lenses.

This illumination device will be removably fitted so as to be readily introduced as in Fig. 11, or, alternatively, withdrawn as in Fig. 12 from the optical system preparatory to showing wide film, or ordinary standard or single width film respectively.

Although I have spoken of my invention as giving the means of showing the hereinabove defined standard cinematograph film as well as color cinematograph film of the class described by one and the same projector which is in general what is desired it may be considered expedient by some worker or workers to establish a different standard which may come into more or less general use, or alternatively which may constitute a standard in relation to a special field of work, e. g., a particular or special smaller standard might be established for home cinematography as distinguished from ordinary cinematography, or there may be reversion to a larger picture for special large theaters or high class shows. Therefore I wish it understood that my invention covers its application to such departures, and in the appended claims "standard" whether referring to the film, or size, pitch and separation of the two rows of perforations is to be regarded as including such departures as hereinabove described.

What I claim is:—

1. Projecting apparatus capable of showing either a color record cinematograph film of the class described or a standard film as herein defined, such color film being formed so as to run on standard sprocket rims, and so as to have a plurality of rows of perforations true to gage to drive it, the projector having feed and take up sprocket wheels comprising standard sprocket rims, and an intermittent movement comprising that suited for standard film, a wide multiple gate-apertured film track, a corresponding number of lenses, means for illuminating, and distributing and directing the light through such gate apertures and such lenses, means for cutting off the light during the period of motion of the film, means for adjusting the illumination for that one of the gate apertures which corresponds to the standard sprocket rims, means for closing the remaining gate aperture or apertures, and means for retaining the standard film in its track.

2. Projecting apparatus capable of showing either a color record cinematograph film of the class described or a standard film as herein defined, such color record film being formed so as to run on standard sprocket rims, and so as to have a plurality of rows of perforations true to gage to drive it, the projector, having feed and take up sprocket wheels comprising standard sprocket rims, and an intermittent movement comprising that suited for standard film, a wide multiple gate-apertured film track, a corresponding number of lenses, means for illuminating, and distributing and directing the light through such gate apertures and such lenses, means for cutting off the light during the period of motion of the film, means for adjusting the illumination for that one of the gate apertures only which corresponds to the standard sprocket rims, and means for retaining the standard film in its track.

3. A cinematograph projector for carrying out the method herein described having feed and take up sprocket wheels comprising standard sprocket rims, an intermittent movement suited for standard film, a wide multiple gate-apertured film track, a corresponding number of lenses, a single light source, means for distributing and directing the light through such gate apertures and such lenses, removable color filters, means for adjusting the illumination for that one of the gate apertures which corresponds to the standard sprocket rims, means for closing the remaining gate aperture or apertures, means for removing the color filters, and means for retaining the standard film in its track.

4. A cinematograph projector for showing either a multi-color record cinematograph film of the class described or a standard film as herein defined comprising standard sprocket rims, an intermittent movement suited for standard film, a wide multiple gate-apertured film track, a multiplicity of lenses, means for illuminating and distributing and directing the light through such gate apertures and such lenses, means for adjusting the illumination for that one of the gate apertures which corresponds to the standard sprocket rims, means for closing the remaining gate aperture or apertures and means for retaining the standard film in its track.

5. A cinematograph projector for showing either a multi-color record cinematograph film of the class described or a standard film as herein defined comprising standard sprocket rims, an intermittent movement suited for standard film, a wide multiple gate-apertured film track, a multiplicity of lenses, a single light source, means for distributing and directing the light through such gate apertures and such lenses, means for adjusting the illumination for that one of the gate apertures which corresponds to the standard sprocket rims, means for closing the remaining gate aperture or apertures and means for retaining the standard film in its track.

6. A cinematograph projector for showing either a multi-color record cinematograph film of the class described or a standard film as herein defined comprising standard sprocket rims, an intermittent movement suited for standard film, a wide multiple gate-apertured film track, a multiplicity of lenses, means for illuminating and distributing and directing the light through such gate apertures and such lenses, removable color filters, means for adjusting the illumination for that one of the gate apertures which corresponds to the standard sprocket rims, means for closing the remaining gate aperture or apertures, means for removing the color filters, and means for retaining the standard film in its track.

7. A cinematograph projector for showing either a multi-color record cinematograph film of the class described or a standard film as herein defined comprising standard sprocket rims, an intermittent movement suited for standard film, a wide multiple gate-apertured film track, two lenses, a single light source, means for distributing and directing the light through such gate apertures and such lenses, removable color filters, means for adjusting the illumination for that one of the gate apertures which corresponds to the standard sprocket rims, means for closing the remaining gate aperture or apertures, means for removing the color filters, and means for retaining the standard film in its track.

In testimony whereof I affix my signature.

HAROLD WORKMAN.